United States Patent
Gerspach et al.

(10) Patent No.: US 10,601,650 B2
(45) Date of Patent: Mar. 24, 2020

(54) METHOD FOR AUTOMATED CONFIGURATION OF AN IED

(71) Applicant: ABB Schweiz AG, Baden (CH)

(72) Inventors: Stephan Gerspach, Herrischried (DE); Wolfgang Wimmer, Langenthal (CH); Thomas Werner, Spreitenbach (CH); Otmar Görlitz, Fislisbach (CH); Claudio Honegger, Wald (CH)

(73) Assignee: ABB Schweiz AG, Baden (CH)

( * ) Notice: Subject to any disclaimer, the term of this patent is extended or adjusted under 35 U.S.C. 154(b) by 228 days.

(21) Appl. No.: 15/695,339

(22) Filed: Sep. 5, 2017

(65) Prior Publication Data

US 2017/0366397 A1 Dec. 21, 2017

Related U.S. Application Data

(63) Continuation of application No. PCT/EP2016/054464, filed on Mar. 2, 2016.

(30) Foreign Application Priority Data

Mar. 4, 2015 (EP) .................................... 15157574

(51) Int. Cl.
*G06F 15/16* (2006.01)
*G06F 16/35* (2019.01)
(Continued)

(52) U.S. Cl.
CPC .......... *H04L 41/0806* (2013.01); *H04L 67/34* (2013.01); *H04L 41/12* (2013.01);
(Continued)

(58) Field of Classification Search
USPC ................................. 709/222, 203, 221, 224
See application file for complete search history.

(56) References Cited

U.S. PATENT DOCUMENTS 6,535,797 B1 * 3/2003 Bowles ..................... H02J 3/00
                                                                  700/286
6,766,143 B1 * 7/2004 Beckwith .............. H04W 84/18
                                                                  343/784

(Continued)

FOREIGN PATENT DOCUMENTS

| EP | 1157525 | 7/2001 |
| EP | 1976177 B1 | 7/2014 |
| WO | 2013057666 A1 | 4/2013 |

OTHER PUBLICATIONS

European Search Report, EP15157574.3, ABB Technology AG, dated Aug. 26, 2015, 8 pages.

(Continued)

*Primary Examiner* — Jude Jean Gilles
(74) *Attorney, Agent, or Firm* — Taft Stettinius & Hollister LLP; J. Bruce Schelkopf

(57) ABSTRACT

The present application is concerned with a method for loading configuration data to a first Intelligent Electronic Device IED in a Substation Automation SA system, wherein the SA system included a second IED connected to the first IED via a communication network. The method includes: determining a first SID for the first IED by means of a neighbour ship relation, wherein the neighbour ship relation is predefined and indicative of a relative arrangement of the first and second IED in the communication network; assigning the first SID to the first IED; and obtaining first configuration data corresponding to the first SID, and loading the first configuration data to the first IED. The Global Identification GID of the first IED may be determined from the communication network, and the first SID can be linked with the GID of the first IED. The present application concerns also an active IED for configuration of a new or replaced IED in the substation system, according to the above mentioned method.

24 Claims, 2 Drawing Sheets

(51) Int. Cl.
*G06F 17/27* (2006.01)
*H04L 12/24* (2006.01)
*H04L 29/08* (2006.01)

(52) U.S. Cl.
CPC ............. *Y02D 30/30* (2018.01); *Y04S 40/162* (2013.01); *Y04S 40/164* (2013.01)

(56) References Cited

U.S. PATENT DOCUMENTS

| | | | |
|---|---|---|---|
| 2004/0083278 A1 | 4/2004 | Becherer | |
| 2005/0183118 A1 | 7/2005 | Steindl | |
| 2008/0005228 A1* | 1/2008 | Subbian | H04L 51/066 709/203 |
| 2008/0103631 A1* | 5/2008 | Koliwad | H04Q 9/00 700/286 |
| 2010/0094573 A1* | 4/2010 | Yang | H02J 3/00 702/61 |
| 2010/0325304 A1* | 12/2010 | Wimmer | H04L 67/125 709/232 |
| 2011/0161468 A1* | 6/2011 | Tuckey | H04L 41/0803 709/220 |
| 2011/0202669 A1* | 8/2011 | Liang | H04L 12/6418 709/228 |
| 2012/0053744 A1* | 3/2012 | Manson | H02J 3/14 700/293 |
| 2013/0018521 A1* | 1/2013 | Manson | H02J 3/14 700/297 |
| 2013/0174223 A1* | 7/2013 | Dykeman | G06F 21/10 726/4 |
| 2013/0198245 A1* | 8/2013 | Kagan | H04L 67/06 707/812 |
| 2013/0275566 A1 | 10/2013 | Huth et al. | |
| 2013/0342159 A1* | 12/2013 | Paschke | F16M 11/041 320/108 |
| 2015/0134134 A1* | 5/2015 | Buker | H04L 12/2807 700/286 |
| 2015/0311714 A1* | 10/2015 | Dolezilek | H02J 13/0013 700/286 |
| 2015/0318739 A1* | 11/2015 | Oda | H02H 7/26 700/292 |
| 2016/0036633 A1* | 2/2016 | Lee | H04L 41/085 709/221 |

OTHER PUBLICATIONS

International Search Report and Written Opinion, PCT/EP2016/054464, ABB Technology AG, dated May 27, 2016, 12 pages.

* cited by examiner

METHOD FOR AUTOMATED CONFIGURATION OF AN IED

FIELD OF THE INVENTION

The present invention relates to the field of Industrial Automation and Control Systems, IACS, such as Substation Automation, SA, systems. The present invention particularly relates to a method of configuration of an Intelligent Electronic Device IED in the SA system and automatically loading the correct configuration data at system installation or spare part replacement to the devices of a control system, or, in the restricted scope of an IED, to replaced modules belonging to this IED.

BACKGROUND OF THE INVENTION

An IACS comprises usually a set of communicating IEDs, each may have its special purpose, which can be defined in the basic software or firmware on the IEDs, related to the IED type, and system/project specific configuration data. This IED specific configuration data needs to be engineered and then loaded onto the IED before it can be activated in the system. Inside the system it should be ensured that each IED has a unique identity for its tasks in the system, and unique configuration data allowing to fulfill its task. Thus, no two IEDs with the same identity and configuration data should exist, in particular, in a same Substation System. Nowadays most of the IEDs are standard compliant and can be described using following terms:

Global Identification, GID: a world-wide unique identification of an IED as unique string value or as a unique communication address. This can be a manufacturer serial number as well as e.g. in Ethernet based communication systems the Ethernet MAC address, and identifies uniquely a piece of hardware, e.g. the IED. This IED taken together with the manufacturer name or the communication protocol identification is typically 'world-wide' unique, similar as the World Wide Name, WWN, in the storage technology.

IED type: the type of an IED defines basic functionality and capabilities of the IED as well as the ways and the protocols how it can be configured etc. The type together with the manufacturer identification uniquely defines this set of capabilities. If an IED shall be replaced and loaded with the predefined configuration data, the new IED should have the same IED type. In detail this may be a type identification string, possibly together with a version number.

System identification, SID: the identification of the place and/or role of an IED inside a system. Each IED inside the system has a system wide unique identification, and tied to it are one or more communication level identifications. The configuration data engineered for an IED in the system depends mainly on its role in the system. The SID is often an IED name, coupled with at least one communication level address allowing loading the IED with its role specific configuration data.

Configuration application, CA: an application holding the configuration data for all or some IEDs of the system. The configuration data is tied to the SID, and via the IED type the CA 'knows' how to principally load this data to an IED of the correct type.

In case that an IED fails, it might need to be replaced by as IED of the same type, the correct system identity given to it, and the correct configuration data loaded. In many cases human beings manually perform these tasks related to a first system startup as well as to replacement of failed devices, e.g. IEDs or modules of an IED. This needs time and is error prone.

US 2004/083278 describes a network having a plurality of nodes in which node-specific data for parameterizing and/or configuring a first one of the nodes is stored in a second one of the nodes of the network.

US 2013/0275566 describes a method for configuring at least one device in an Ethernet based communication network comprising a plurality of devices with Ethernet capability, wherein the topological position of a respective device to be configured, which is associated with a device type, in the communication network is ascertained, the respective device is sent configuration data, which correspond to its device type and to its ascertained topological position, from a database which contains a plurality of configuration data for at least one device type and a plurality of topological positions of the at least one device type, and the respective device is then configured based on the transmitted configuration data.

US 2005/0163118 describes a method for assigning an IP address to a device, comprising the following steps: connecting the device to a port of a switch, transmitting an identification code of the port from the switch to the device, transmitting the identification code of the port from the device to an address server, assigning the IP address to the device on the basis of the identification code of the port.

DESCRIPTION OF THE INVENTION

It is therefore an objective of the invention to provide a method automated configuration process of a new or replaced IED using the existing components and information is a SA system. This objective is achieved by a method and a device according to the independent claims. Preferred embodiments are evident from the dependent patent claims.

The present invention provides a method for loading configuration data to a first IED, e.g. a new or replacement IED, in a SA system. The SA system comprises a second IED, i.e. an existing IED which is up and running, connected to the first IED via a communication network. The method comprises the steps of: a) determining a first System Identification SID for the first IED by means of a neighbour ship relation, wherein the neighbour ship relation is predefined in a relationship table stored in the second IED and indicative of a relative arrangement of the first and second IED in the communication network; b) assigning the first SID to the first IED; and c) obtaining first configuration data corresponding to the first SID, and loading the first configuration data and relationship table to the first IED. The neighbourship relation includes the relative arrangement the first and second IED in the commutation network as well as the SID used in the original first IED before replacement or reinstallation. For example, when an old IED has been replaced by a new IED, the IED connected next to the old IED knows which SID had been used in the old IED, thereby also the SID supposed to be used in the new IED. The neighbourship relation may be defined before the installation of the IEDs of the substation, e.g. in a network topology plan.

Typically, the SA system comprises a plurality of IEDs. Any IED has a relationship table comprising neighbour-ship relations indicative a relative arrangement of each of the IEDs and its two neighbours IEDs, respectively. In other words, all IEDs know the neighbour-ship relations in the entire SA system, i.e. the configuration such as identity and SID from all other IEDs and know all the neighbours. Thus, there is no need to preconfigure any of the IEDs at start-up.

The system loads the SID to one IED and depending on the neighbour ship, the other SIDs will be determined and configured automatically. Thus, the whole configuration process of the IED can be performed in a propagated manner.

The configuration of the first IED is performed in an automated manner and works also when it is installed for the first time, since the SID can be also retrieved from the network topology plan. In the initial stage of the installation, all the IEDs can be manually preconfigured with the correct SID, according to the network topology plan. Alternatively, only one initial IED is manually configured and it contains the neighbour-ship relation. The other IEDs can be configured in an automated manner according to the present invention.

Preferably, the method according to the present invention further comprises the step of: gathering, from the communication network, a Global Identification GID of the first IED, and associating the first SID with the GID of the first IED. In other words, the SID is linked with or bounded to the GID. After the first SID is assigned and associated with the GID, the other IEDs in the substation can addressee the communication to the first IED using its GID.

The first and second IED can be connected next to each other, either as virtual neighbours in view of their switch ports or as physical neighbours, i.e. connected directly in a network without other IEDs therebetween. In particular, the communication network can be an Ethernet ring according to the High-availability Seamless Redundancy HSR protocol. In this case the firsts IED is connected adjacent to the second IED via the Ethernet ring, from the physical network topology. The first and second IED can still be located a few hundred meters from each other, but they are connected next to each other since there is no other IED between them.

A communication system physically using point to point connections between identified devices can be ordered in such a way, that each IED has another IED before and after it, i.e. neighbours or "virtual" neighbours can be determined.

A switch based Ethernet system with only duplex connection has for each connected IED a unique identification by means of the SID of the switch, e.g. its IP address, and the port ID of the hardware port at the switch, to which the IED is connected. The Link Layer Discovery Protocol, LLDP, allows to determine which IED is connected to which hardware port of an individual switch. This can be e.g. used to check the correctness of switch configurations.

The method according to the present invention can also be used alter commissioning to determine the current relation between GID, e.g. switch ID and switch port ID, to a SID, e.g. IED name and IP address in IEC 61850, of application IEDs, not just Ethernet switches. If a new IED is detected later, e.g. by means of LLDP, at a certain switch port, e.g. a specific Switch ID/Port ID assigned to a SID, which has a wrong or just a basic configuration but the correct IED type, it can be assigned to the corresponding SID and its correct configuration data loaded from some CA.

This CA can naturally be located centrally in the SA system, or decentrally distributed to all neighbours. As already described above, also for switch based tree networks, "Virtual neighbours" might be defined, e.g. always the IEDs with the next higher and next lower port address at the same switch, and if a neighbour port number is below 1 or above the maximum port number, the highest post at next lower switch respective lowest port at next higher switch is used as neighbour. Thus the relation between SID and GID is decentrally but redundantly stored in the system allowing to automatically assign a SID to a new IED, and concerning the CA location all said for the ring is also valid.

The neighbour-ship relation between the first and second IED can be preconfigured at engineering time and loaded into the CA IEDs, or can be retrieved or determined from the existing SA system after a first commissioning, e.g. from the second IED or from a Configuration Application, CA, using a Link Layer Discovery Protocol LLDP. The neighbour-ship relation describes which functions the first IED should provide within the SA system. Accordingly, the SID of the first IED can be determined. Further, the first SID can be associate to the GID of the first IED, which enables the communication to the first IED within the communication network.

Preferably, the first SID can comprise a role definition for the first IED, and the method further comprising the step of: determining type information if the first IED to verify if the first IED is compliant with the role. This can avoid that the first IED takes over the role but it is not capable to. The verification can be done be checking the IED type of the first IED, where for security reasons the information of the IED can be signed with a certificate. After the verification, the first IED can be activated or configured with the first configuration data.

Preferably, the second IED can further comprise second configuration data corresponding a second SID of the second IED, and the first IED can store the second configuration data. In case the second IED needs to be replaced after the first IED being activated, this can be done by the first IED since it has the SID and configuration data for the second IED.

According to another aspect, the present invention also provided an activated IED in a Substation Automation SA system, where the activated IED is adapted for loading configuration data to a new IED that needs to be configured. The activated and the new IED are connected to each other via a communication network, e.g. adjacent to each other via an Ethernet ring according to the HSR protocol. Alternatively, the activated and new IED can be connected respectively via adjacent switch ports in view of port numbering. The activated IED is adapted to: gather, from the communication network, a Global Identification GID of the new IED; determine a System Identification SID for the new IED, wherein the neighbour ship relation is predefined and indicative of the relative arrangement of the first and second IED in the communication network; assign the SID to the new IED by associating the SID of the first IED with the GID of the first IED; obtain first configuration data corresponding to the SID of the first IED, and load the first configuration data to the new IED.

When none of the IEDs in the substation system is configured or activated, e.g. in the initial or installation phase of the substation, there is a need to do an initial configuration loading, e.g. using one of the following steps:

(a) the SID can be loaded manually into each IED. After the physical cabling, the relation between SID and GID for each IED at a special physical place is read from the system and stored into the IEDs, so that all neighbour IEDs know the SID neighbour-ship relation between the neighbours. This information can be later used to automatically load replaced or spare IEDs according to the method introduced before.

(b) the relation between SID and physical place respective neighbours can be predefined at the engineering phase, and at installation this relation as well as the intended physical connections should be kept. In this case only the initial IED and the CA, possibly also on the initial IED, needs to be manually configured. As the initial IED has the neighbour ship relation information between itself and the other neighbours, i.e. the SID of its neighbours, it can then automatically trigger loading of its neighbour IEDs. The normal signal testing at commissioning will assure also the correct physical neighbour connection.

The method according to the present invention is less error prone and can provide faster replacement of spares. A completely self-booting system, i.e. automatically loading system, can reduce the installation and commissioning effort. Further, the system keeps itself in consistent configuration version are available inside the CA or CAs.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their primary meanings, are listed in summary form in the list of designations. In principle, identical parts are provided with the same reference symbols in the figures.

DETAILED DESCRIPTION OF PREFERRED EMBODIMENTS

Figure 1:
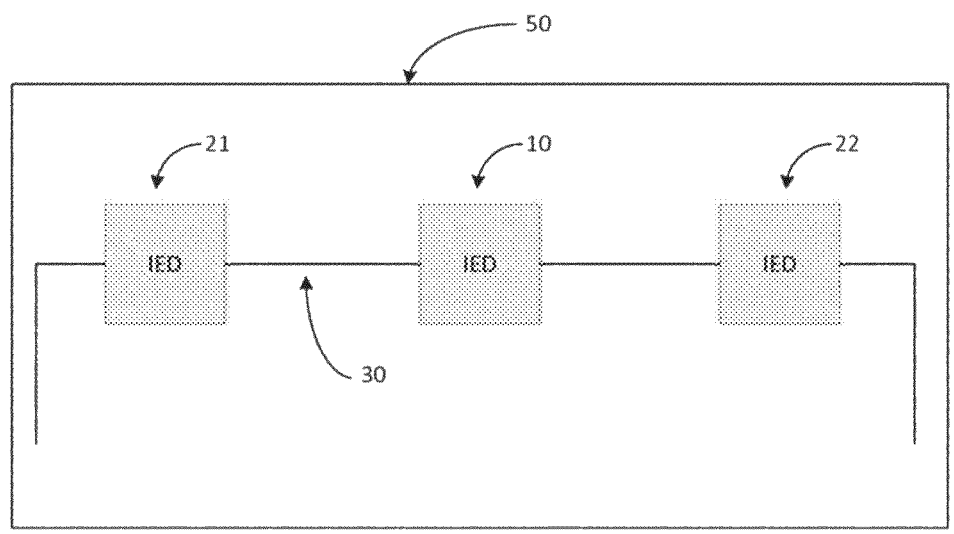
FIG. 1 schematically shows the first IED 21, 22 and the second IED 10 being connected next to each other via a HSR ring.

FIG. 1 shows a simple neighbour ship relation inside an Ethernet based HSR ring 30. The IED 10 is a configured and activated IED in the substation system 50, whereas the IED 21 or 22 is the newly installed spare IED that needs to be configured. The spare IED 21 and 22 is connected next to the IED 10, i.e. they are neighbours. The IED 10 can retrieve the GID of the spare IED 21, 22. Further, IED 10 can determine, based on neighbour ship relation information, which SID the spare IEDs 21, 22 shall be connected at its 'left' and 'right' side. In other words, the IED 10 knows which SID its neighbors IEDs at left and right should have. Thus, based on this neighbour ship relation information, the IED 10 can check if the neighbour IEDs 21, 22 have the correct SID. If the SID is not correct, the IED 10 can assign the correct SID to the spare IED 21, 22. When the assignment of the SID is successful, the loading of the corresponding configuration data can be triggered. This can be either done by the activated IED 10 or by notifying the CA in the system having the configuration data for the appropriate SID.

In order to load the correct system role specific configuration data onto a 'generic' spare IED 21 or 22 having only a GID, the SID of the IED 21 or 22 can be determined and respective bounded to its GID. The GID of the IED 21 and 22 can be retrieved using the protocol LLDP. The following methods can minimize the manual work in doing this:

for the Lon bus an IED has a button, which sends its GID to the bus. Thus a CA can be brought into a state for configuring a certain SID by waiting for this GID message, and, if the button is pressed and the message arrives, it binds this GID to the SID and then downloads the configuration data.

for CAN bus the physical place on the bus determines by hardware a SID communication address, i.e. the GID is not a communication address, but the SID is given by the system hardware.

the CA physically directly connected to the IED 21, 22 that needs to be configured, via a 'local' interface of the IED. The relation between GID and SID can be determined by the local physical cable link. Naturally this IED needs to be wired, before or after configuration loading, to its intended place in the process.

The SID can be derived from the physical placement of the IED, e.g. similar to CAN bus by some physical address tied to a certain rack, place of the rack, or by GPS coordinates linking the SID to a geographical position.

The invention introduces additionally the concept of neighbourhood for this purpose:

The SID of the neighbour IED 21, 22 can be associated with the GID of the neighbour IED 21, 22 determined by exploring the neighbour IED, where the GID is worldwide unique. When the IED is configured with the configuration data and activated, the other IEDs in the substation system 50 can communicate with the IED 21, 22 using the GID of the IED 21, 22.

The HSR ports A and B can explicitly define the neighbour ship relation left/right, and the Link Layer Discovery Protocol LLDP allows getting the needed data such as needed information such as GID from the neighbour IEDs.

Once the correct SID for the new IED 21,22 has been determined, it may be automatically assigned using the following approaches: by place in the bus system or in a physical cabinet, the SID related communication address, e.g. the GID, is automatically given; or by means like GPS or a machine readable tag at the related process equipment, the IED determines its physical position respective relation to the process and thus determines its SID from a known relation between possible SIDs and preconfigured geographical respective process locations.

After the correct SID has been assigned to the new IED 21, 22, the loading of configuration data can be triggered. One possibility is to arrange the CA centrally. In this case, after assignment of a SID to a new IED, it can ask the CA for its configuration data. Alternatively, if all IEDs have a SID, the CA can scan the IEDs having a SID and cheek, if their configuration corresponds to the intended state, and load the IED with this intended state if this is not the case. Another possibility is that all devices contain all configuration data for all system roles and activate only that part corresponding to their SID. This may be a preferred solution inside an IED to configure its modules. These processes may run automatically, if the new IED has a SID.

Optionally, in order to assure a safe procedure and determine possibly different loading processes, the IED can optionally check the capabilities of its neighbour e.g. by reading its IED type or software/hardware version before assigning the SID.

Further, as automatic processes can be used to jeopardize a system e.g. by introducing IEDs tempered with, for security reasons the IED capability strings like its type might need to be authenticated by a certificate of the manufacturer of this IED type, or by the system, integrator or system owner certificate. If for some reason the IED type is not used, e.g. because all IEDs have the same capabilities, then a separate authentication process for usage of the IED is needed.

This basic communication can use the GID communication address, where in case of Ethernet this is the MAC address, or the physical neighbour ship as LLDP supports.

With the IED initialisation procedure already at system start-up, only one IED needs to be manually configured. This IED can then determine the SID of its neighbors and trigger the loading of their configuration data.

Additionally, for this loading several variants are possible, as already indicated above:

- an IED contains the configuration data of all IEDs in the ring. A stew IED, after having its SID, is loaded with this full set of configuration data, however only activates that part belonging to its SID.
- an IED only contains the configuration data of its left and right IED. As any IED has two neighbours, there is some redundancy in case of IED replacement. However at system start-up the (different) configuration sets have to be supplied manually or from a central CA, and at reconfiguration, the new IEDF has to retrieve the configuration data of its neighbours to support a later replacement of them.
- the IED with a SID assigned only knows the SIDs its neighbours shall have. After a new IED with GID has gotten its SID from its neighbour(s), it can be loaded by some CA, or trigger the loading from some CA, or even load its configuration from some CA by itself. These CA's might exist per IED (if modules need to be configured), per subsystem, or one for the whole system, possibly redundant.

Figure 2:
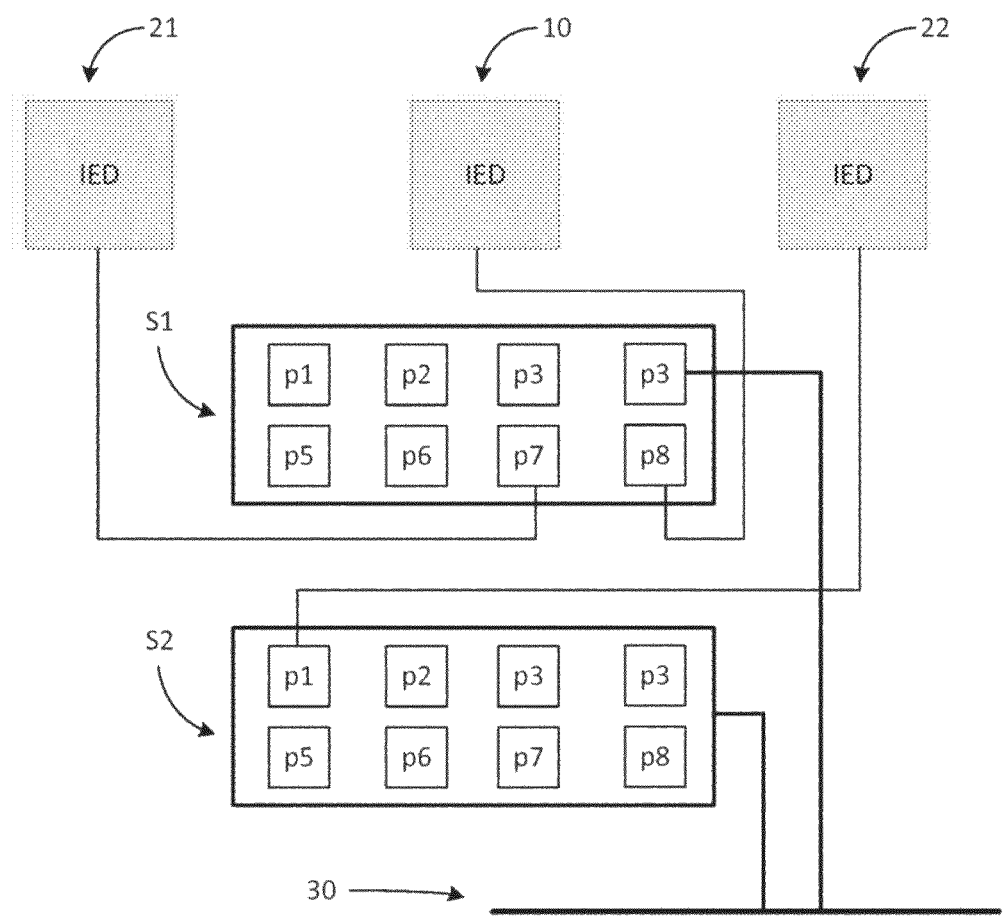
FIG. 2 schematically shows the first IED 21,22 and the second IED 10 being connected via switches, where the switch ports to which the IEDs are connected are next to each other.

FIG. 2 shows a virtual neighbour-ship relation of the IEDs, where the first IED 10 is a configured and activated IED in the substation system 50, and connected with the second IED 21 via switches S1 and S2 in the communication network, in particular, via the switch port p8 and p7 of the switch S1. Thus, the switch port number 8 and 7 are located adjacent to each other in view of the port numbering topology. In other words, the switch port is in juxtaposition with each other according to part numbering. According to the present invention, the second IED 21 is considered to be a virtual neighbor of the first IED 10.

As explained for FIG. 1, the SID can be determined, for the network connection in FIG. 2 as well. In particular, if a physical identification for an IED exists, e.g. switch ID and port number to which the IED is connected, the relation of SID to this physical identification can be read out from the system after commissioning, and can later be used to assign the SID to new or replaced IEDs connected to the same switch and switch port.

For example, the second IED 22 is connected to the switch port having the first number p1 of the switch S2, Since the port number 8, where the first IED is connected to, is the last port of switch S1, the switch port p1 of the second switch S2 can be considered as next to or adjacent to the switch port 8 of switch S1, in view of the port numbering topology. Thus, the second IED 22 is also a virtual neighbour of the first IED 10, according to the present invention.

Similar as the connection shown in FIG. 2, the first IED 10 has the neighbour ship relation information about the neighbour IEDs 21, 22. Based on this information, the first IED 10 can check the neighbour IED 21, 22, and assign the correct SID to the neighbour IEDs 21, 22, in case of need. After the assignment, the configuration data corresponding to the SID of the IEDs can be transferred to the IEDs 21, 22.

The remaining steps of the method such as determining loading the configuration data and triggering the loading as well as assigning the correct configuration data to the IED 21, 22 are similar as above explained for FIG. 1.

Figure 3:
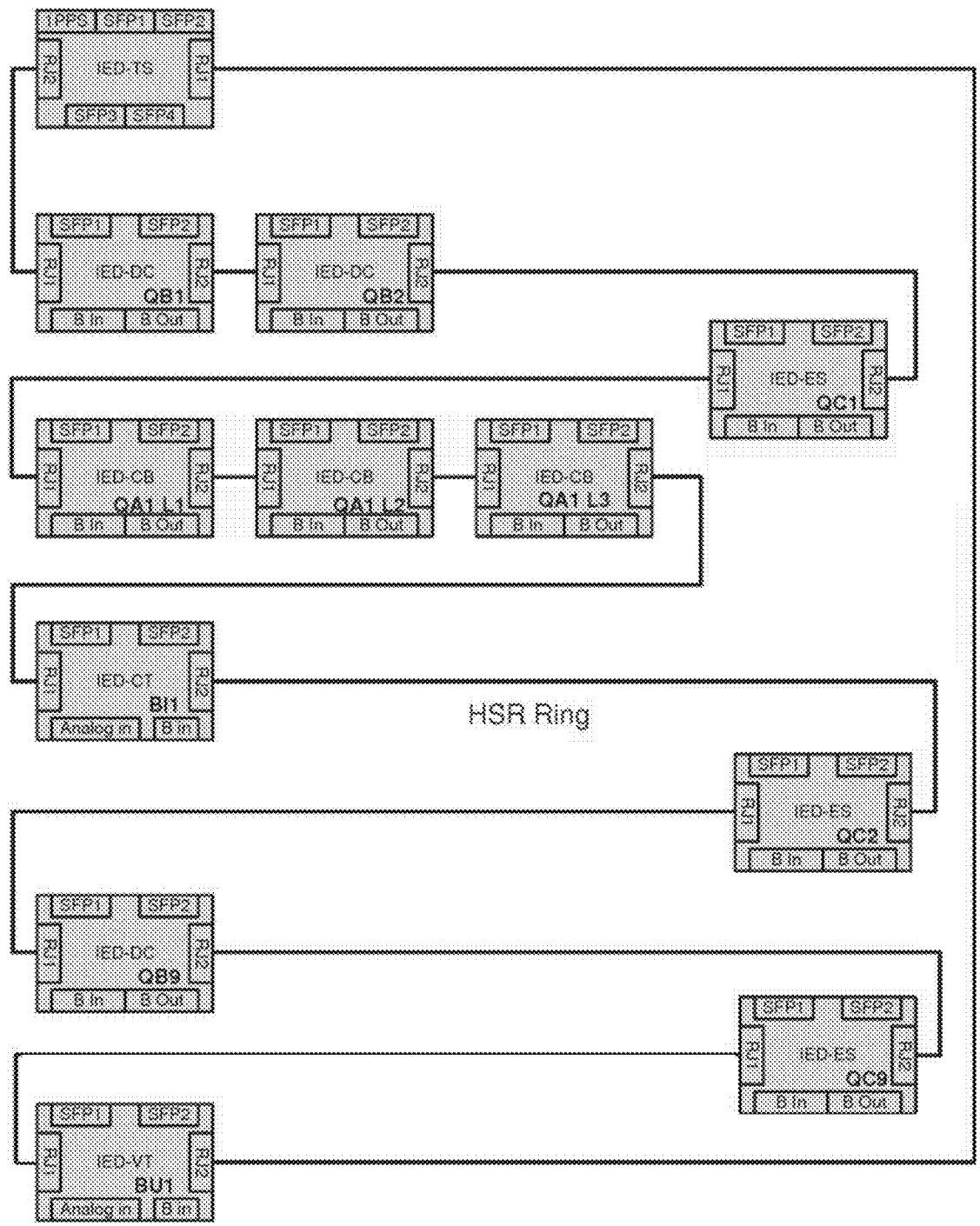
FIG. 3 shows an implementation example using HSR ring network.

FIG. 3 shows an implementation example, where on the HSR ring 30 each IED 'knows' the SID of its left neighbour, e.g. an IED connected port A, and right, e.g. IED connect with port B. The IEDs or IED modules shown in FIG. 3 may be generic IEDs configured to perform particular function, which is apparent in their suffix, e.g. DC, CB or ES. With LLDP each IED can cheek if the current neighbours have the correct SID. If this is no longer the case, an alarm is set, the neighbour IED type can be checked, and, if OK, the correct SID assigned to it. After this the configuration loading process from a CA is started. There may be one CA per ring, or one CA for the whole system, or each IED is the CA for its neighbours.

In particular, each IED may have stored the configuration data for the IEDs. Thus, each of the running IEDs is capable to configure a new or replaced IED. In particular, each IED identities itself and the related part in the IED configuration based on the connection to the primary process. Inside an IEC 61850 system the identification may be done based on LDname, e.g. xxxYYYQB2. In case the IED QC1 fails and should be exchanged, a spare IED or IED module, preferably of same type, could be installed. The neighbour IEDs OB2 or QAIL1 can detect the exchange and transfer the IED configuration data to the spare IED or IED module. In other words, the spare IED can be automatically configured and activated, i.e. up and running again.

As explained before, the relationship table containing the neighbour-shop relations of each IED and its neighbours is stored in each IED. For instance, the relationship table including the neighbour-shop relations of all IEDs in FIG. 3 can be the follows:

| Left | First | right |
|---|---|---|
| QC1 | QA1 L1 | QA1 L2 |
| QA1 L1 | QA1 L2 | QA1 L3 |
| QA1 L2 | QA1 L3 | BI1 |
| Qa1 L3 | BI1 | QC2 |
| BI1 | QC2 | QB9 |
| QC2 | QB9 | QC9 |
| BU1 | QC9 | QB9 |
| QC9 | BU1 | TS |
| QB1 | TS | BU1 |
| TS | QB1 | QB2 |
| QB1 | QB2 | QC1 |
| QAI L1 | QC1 | QB2 |

For example, the node QC2 knows the complete table with the SIDs. It can assign to the left and right neighbours their SIDs and load the complete table. The nodes B11 and QB9 can do the same and so the configuration propagates though the entire system.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claim does not indicate that a combination of these elements or steps cannot be used to advantage, specifically, in addition to the actual claim dependency, any further meaningful claim combination shall be considered disclosed.

The invention claimed is:

1. A method for loading configuration data to a first Intelligent Electronic Device IED in a Substation Automation SA system, wherein the SA system comprises a second IED connected to the first IED via a communication network, wherein the method comprises the steps of:
- a) determining a first System Identification SID for the first IED by means of a neighbourship relation, wherein the neighbourship relation is predefined in a relationship table stored in the second IED and indicative of a relative arrangement of the first and second IED in the communication network,
- b) assigning the first SID to the first IED, and
- c) obtaining first configuration data corresponding to the first SID, and loading the first configuration data and the relationship table to the first IED.

2. The method according to claim 1, further comprising the step of:
gathering, from the communication network, a Global Identification GID of the first IED, and
associating the first SID with the GID of the first IED.

3. The method according to claim 1,
wherein the first IED is connected to the second IED via a first and second switch port in the communication network, respectively, and
wherein the first and second switch port are adjacent to each other in view of the port numbering topology.

4. The method according to claim 1,
wherein the communication network is an Ethernet ring according to the High-availability Seamless Redundancy HSR protocol, and wherein the first IED is connected adjacent to the second IED via the Ethernet ring.

5. The method according to claim 2, wherein the GID of the first IED is gathered using a Link Layer Discovery Protocol, LLDP.

6. The method according to claim 1, wherein the first configuration data is obtained from a Configuration Application, CA, in the SA system.

7. The method according to claim 1, wherein the first configuration data is obtained from the second IED.

8. The method according to claim 1, wherein the first SID comprises a role definition for the first IED, and the method further comprising the step of:
determining type information of the first IED to verify if the first IED is compliant with the role.

9. The method according to claim 8, wherein the type information is signed with a certificate.

10. The method according to claim 1, further comprising the step of:
- e) activating the first IED using the first configuration data.

11. The method according to claim 1, wherein the second IED further comprises second configuration data corresponding a second SID of the second IED, wherein the method further comprises the step of:
storing the second configuration data to the first IED.

12. An activated Intelligent Electronic Device IED in a Substation Automation SA system, adapted for loading configuration data to a new IED connected to the activated IED via a communication network, wherein the activated and the new IED are connected adjacent to each other via an Ethernet ring according to the High-availability Seamless Redundancy HSR protocol or connected to each other via adjacent switch ports in view of port numbering, wherein the activated IED is adapted to:
gather, from the communication network, a Global Identification GID of the new IED,
determine a first System Identification SID for the new IED by means of a neighbourship relation, wherein the neighbourship relation is predefined in a relationship table stored in the second IED and indicative of a relative arrangement of the first and second IED in the communication network,
assign the first SID to the new IED by associating the first SID with the GID of the first IED, and
obtain first configuration data corresponding to the first SID, and loading the first configuration data and the relationship table to the new IED.

13. The activated IED according to claim 12, wherein the GID is gathered using a Link Layer Discovery Protocol LLDP.

14. The activated IED according to claim 12, wherein the first configuration data is obtained from a Configuration Application in CA in the SA system, or from the activated IED.

15. The activated IED according to claim 12, further comprising second configuration data corresponding a second SID of the activated IED, wherein the activated IED is adapted to store the second configuration data to the new IED.

16. The method according to claim 2,
wherein the first IED is connected to the second IED via a first and second switch port in the communication network, respectively, and
wherein the first and second switch port are adjacent to each other in view of the port numbering topology.

17. The method according to claim 2,
wherein the communication network is an Ethernet ring according to the High-availability Seamless Redundancy HSR protocol, and wherein the first IED is connected adjacent to the second IED via the Ethernet ring.

18. The method according to claim 3, wherein the GID of the first IED is gathered using a Link Layer Discovery Protocol, LLDP.

19. The method according to claim 4, wherein the GID of the first IED is gathered using a Link Layer Discovery Protocol, LLDP.

20. The method according to claim 2, wherein the first configuration data is obtained from a Configuration Application, CA, in the SA system.

21. The method according to claim 3, wherein the neighbourship relation is defined in a network topology plan before installation of the first and second IEDs.

22. The method according to claim 3, wherein every IED of the SA system has the relationship table.

23. The method according to claim 4, wherein the neighbourship relation is defined in a network topology plan before installation of the first and second IEDs.

24. The method according to claim 4, wherein every IED of the SA system has the relationship table.

* * * * *